United States Patent
Magnuski et al.

(10) Patent No.: US 10,309,354 B2
(45) Date of Patent: Jun. 4, 2019

(54) AIR INTAKE SYSTEM FOR A COMMERCIAL VEHICLE, IN PARTICULAR A TRUCK

(71) Applicant: Daimler AG, Stuttgart (DE)

(72) Inventors: Nicholas Magnuski, Spartanburg, SC (US); David Reynolds, Shelby, NC (US); Derek O'Banion, Gaffney, SC (US)

(73) Assignee: Daimler AG, Stuttgart (DE)

( * ) Notice: Subject to any disclaimer, the term of this patent is extended or adjusted under 35 U.S.C. 154(b) by 10 days.

(21) Appl. No.: 15/641,813

(22) Filed: Jul. 5, 2017

(65) Prior Publication Data

US 2018/0010559 A1 Jan. 11, 2018

(30) Foreign Application Priority Data

Jul. 6, 2016 (GB) .................................. 1611763.2

(51) Int. Cl.
*F02M 35/14* (2006.01)
*F02M 35/16* (2006.01)
(Continued)

(52) U.S. Cl.
CPC ........... *F02M 35/161* (2013.01); *B60K 13/02* (2013.01); *F02M 35/02466* (2013.01); *F02M 35/104* (2013.01); *F02M 35/10091* (2013.01); *F02M 35/10111* (2013.01); *F02M 35/1216* (2013.01); *F02M 35/1272* (2013.01);
(Continued)

(58) Field of Classification Search
CPC ........... F02M 35/161; F02M 35/02466; F02M 35/10111; F02M 35/10242; F02M 35/12; F02M 35/10262
See application file for complete search history.

(56) References Cited

U.S. PATENT DOCUMENTS 3,972,700 A * 8/1976 Gleockler .......... B01D 46/0005
 55/385.3
2004/0065206 A1 * 4/2004 Walker, Jr. ......... B01D 46/0086
 96/381

FOREIGN PATENT DOCUMENTS

CN 103089498 A 5/2013
CN 203009120 U 6/2013
(Continued)

OTHER PUBLICATIONS

GB Search Report issued in GB counterpart application No. GB1611763.2 dated Dec. 14, 2016 (Three (3) pages).

*Primary Examiner* — Kevin A Lathers
(74) *Attorney, Agent, or Firm* — Crowell & Moring LLP

(57) ABSTRACT

An air intake system for a commercial vehicle is disclosed. The air intake system includes a hood with at least one frontal intake opening through which air to be guided to an engine of the commercial vehicle can flow and with at least one plenum configured to receive air flowing through the intake opening. The air intake system further includes at least one air pipe having at least one air duct with at least one inlet opening through which the air flowing through the frontal intake opening can flow, the air duct arranged upstream of and fluidically connected with the plenum so as to guide the air to and into the plenum. The air intake system additionally includes at least one air filter and at least one silencer plate arranged upstream of the air filter, the silencer plate having a plurality of through openings through which the air can flow.

7 Claims, 6 Drawing Sheets

(51) Int. Cl.
*B60K 13/02* (2006.01)
*F02M 35/12* (2006.01)
*F02M 35/024* (2006.01)
*F02M 35/10* (2006.01)
*F02M 35/104* (2006.01)

(52) U.S. Cl.
CPC ........ *F02M 35/14* (2013.01); *B60Y 2200/141* (2013.01); *B60Y 2200/142* (2013.01); *B60Y 2200/145* (2013.01); *B60Y 2306/09* (2013.01)

(56) References Cited

FOREIGN PATENT DOCUMENTS

| | | |
|---|---|---|
| CN | 203098101 U | 7/2013 |
| DE | 198 11 051 A | 9/1999 |
| JP | 2011236853 A * | 11/2011 |

* cited by examiner

AIR INTAKE SYSTEM FOR A COMMERCIAL VEHICLE, IN PARTICULAR A TRUCK

This application claims the priority of Great Britain Patent Application No. 1611763.2 filed Jul. 6, 2016, the disclosure of which is expressly incorporated by reference herein.

BACKGROUND AND SUMMARY OF THE INVENTION

The invention relates to an air intake system for a commercial vehicle, in particular a truck.

DE 198 11 051 A1 shows an air intake system for an internal combustion engine, the air intake system comprising a housing for receiving an air filter. The air intake system further comprises guiding means for guiding air, the guiding means comprising at least two intake pipes. The intake pipes have different lengths, wherein closing means are provided, the closing means being configured to close at least one of the intake pipes.

It is an object of the present invention to provide an air intake system for a commercial vehicle, so that exterior noise and noise within a driver's cab of the commercial vehicle can be kept particularly low.

The invention relates to an air intake system for a commercial vehicle, in particular a truck. The air intake system comprises a hood for at least partially covering an engine compartment of the commercial vehicle. The hood has at least one frontal intake opening through which air to be guided to an engine of the commercial vehicle can flow. For example, in a completely assembled state of the commercial vehicle the engine is arranged in the engine compartment so that, for example, the engine is at least partially covered upwards in the vertical direction of the vehicle by means of the hood. The hood further has at least one plenum configured to receive the air flowing through the intake opening. This means the air flowing through the intake opening can flow into and through the plenum so as to guide the air to and into the engine which is, for example, configured as an internal combustion engine.

The air intake system according to the present invention further comprises at least one air pipe having at least one air duct with at least one inlet opening through which the air flowing through the frontal intake opening can flow so that the air flowing through the frontal intake opening can flow into the air duct via the inlet opening of the air duct. The air duct is arranged upstream of the plenum, wherein the air duct is fluidically connected with the plenum so as to guide the air to and into the plenum. In other words, the air flowing through the air duct can be guided to and into the plenum by means of the air duct. The air pipe and the hood are configured as individual components which are removably connected with each other at least indirectly. This means the air pipe and the hood are not formed in one piece, but the hood and the air pipe are separate or individual components which are removably or reversibly connected with each other. Thus, the air pipe can be mechanically connected with and disconnected from the hood without damaging the hood or the air pipe. The air intake system according to the present invention further comprises at least one air filter configured to filter the air flowing through the air duct and the plenum. Moreover, the air intake system according to the present invention further comprises at least one silencer plate arranged upstream of the air filter. Hence, the silencer plate and the air filter are different components, wherein the silencer plate is provided in addition to the air filter. Preferably, the silencer plate is rigid, i.e., inherently stable.

The silencer plate has a plurality of through openings through which the air can flow. Usually, noise emitted by a vehicle such as a commercial vehicle is regulated by law, the noise being also referred to as noise emissions. Usually, commercial vehicles must be tested where wide open throttle acceleration at the beginning of a 100 foot track continues until rated or governed engine speed is reached within a 20 foot end section. For example, the maximum allowed sound level is 80 decibel (dBA) on either side of the vehicle. The engine is usually the primary noise source, and the results are highly correlated with maximum engine speed. By means of the air intake system according to the present invention, vehicle noise emission regulations can be met particularly efficiently.

Moreover, usually, a commercial vehicle such as a truck comprises a driver's cab configured to accommodate the driver of the vehicle. The air intake system according to the present invention not only reduces the exterior noise produced by a commercial vehicle such as a medium duty truck pertaining to the regulated limits specified, for example, in 40CFR205, but also attenuates noise within the driver's cab, particularly under hard acceleration. Moreover, a modest improvement in engine air intake water separation can also be achieved through a downturned pipe within the hood plenum.

Further advantages, features, and details of the invention derive from the following description of a preferred embodiment as well as from the drawings. The features and feature combinations previously mentioned in the description as well as the features and feature combinations mentioned in the following description of the figures and/or shown in the figures alone can be employed not only in the respectively indicated combination but also in other combination or taken alone without leaving the scope of the invention.

DETAILED DESCRIPTION OF THE DRAWINGS

In the figures the same elements or elements having the same functions are indicated by the same reference signs.

Figure 1:
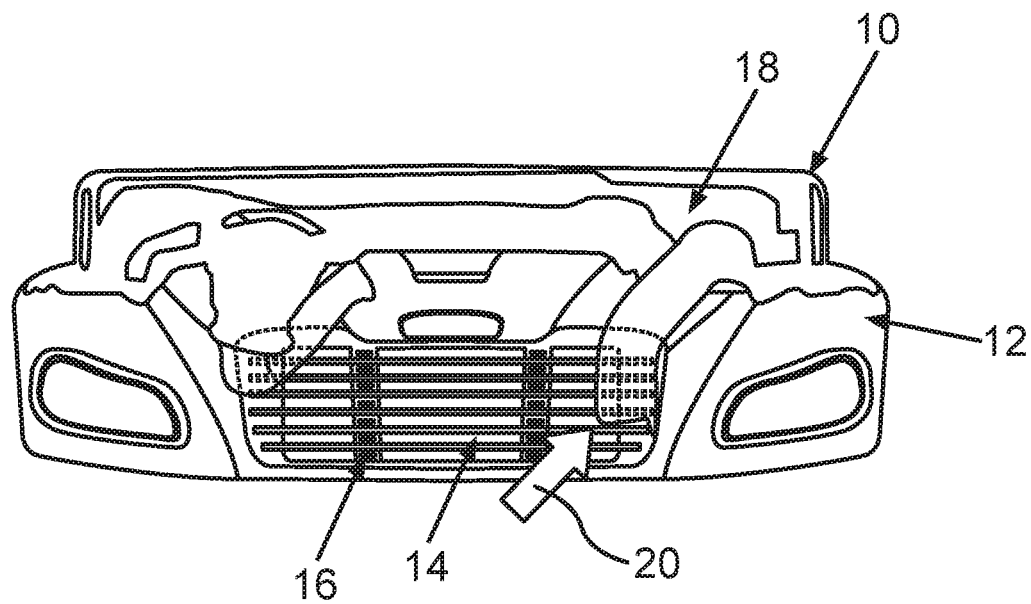
FIG. 1 is a schematic front view of an air intake system according to the present invention.

FIG. 1 shows in a schematic front view an air intake system 10 for a commercial vehicle such as a truck, in particular a medium duty truck. The air intake system 10 is also referred to as an intake system comprising a hood 12 for at least partially covering an engine compartment of the commercial vehicle. In a completely assembled state of the commercial vehicle, the commercial vehicle comprises the engine which is configured as, for example, an internal combustion engine. The engine is configured to drive the commercial vehicle, wherein the engine is arranged in the engine compartment. For example, the hood 12 is rotatably mounted on a body or a frame of the commercial vehicle so that the hood 12 can be rotated between at least one open position and a closed position. In the closed position, at least a portion of the engine compartment and, thus, the engine is covered upwards in the vertical direction of the commercial vehicle. In the open position the portion is uncovered so that, for example, the engine can be repaired or serviced.

As can be seen from FIG. 1, the hood 12 comprises at least one frontal intake opening 14 in which air to be guided to and into the engine can flow. Thus, the inlet opening 14 is configured as a through opening through which air can flow. In the embodiment shown in the figures, the air intake system 10 comprises a grille 16 which is also referred to as a front grill since the grille 16 is arranged in the frontal intake opening 14.

The hood 12 further comprises a plenum 18 configured to receive at least a portion of the air flowing through the frontal intake opening 14. In FIG. 1, air flowing through the frontal intake opening 14 is illustrated by an arrow 20. For example, when the commercial vehicle travels forwards, an amount of the air can flow through the inlet opening 14. At least a portion of the amount of air can flow to and into the plenum 18, wherein the air can flow through the plenum 18 and to and into the engine.

Figure 2:
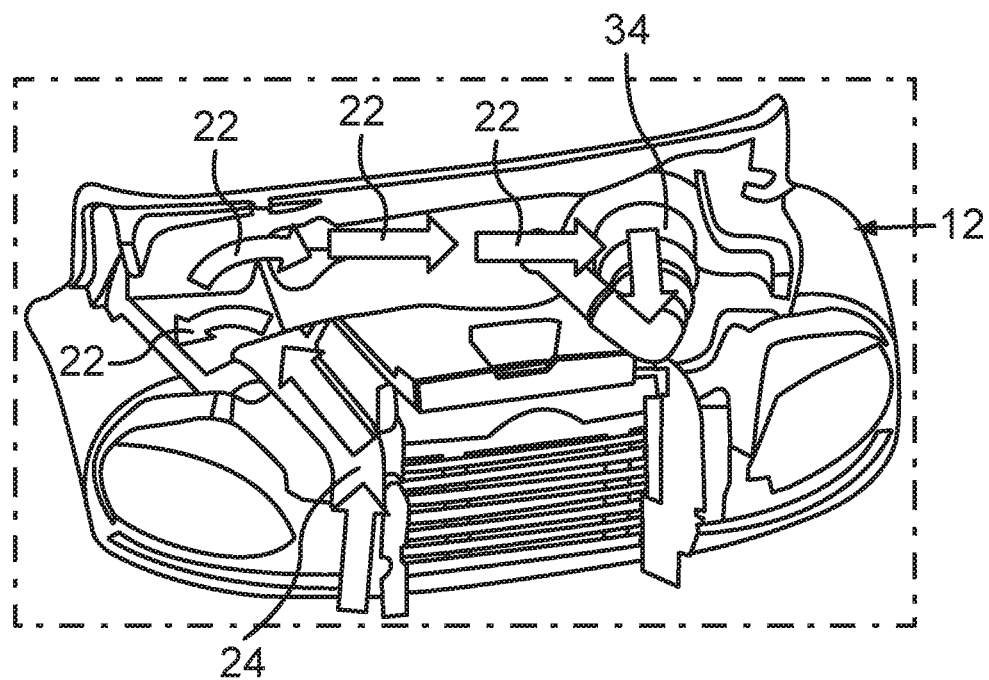
FIG. 2 is a schematic perspective view of the air intake system.

FIG. 2 shows arrows illustrating the flow of the air flowing through an air path of the air intake system 10. In other words, the air intake system 10 comprises at least one air path through which the air to be guided to and into the engine can flow, wherein the air path comprises the plenum 18. This means at least a portion of the air flowing through the inlet opening 14 can flow through the air path and, thus, through the plenum 18 arranged in the air path. By means of the air path, the air flowing through the air path is guided to and into the engine. For example, the air is introduced into at least one combustion chamber of the engine.

Figure 4:
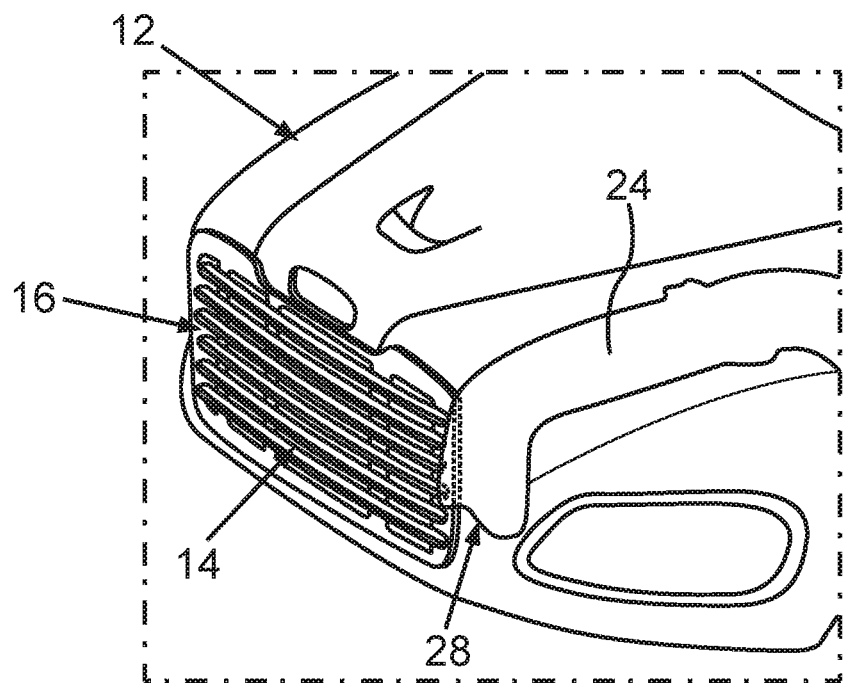
FIG. 4 is part of a schematic perspective view of the air intake system.

For example, arrows 22 shown in FIG. 2 illustrate the air flowing through the plenum 18 of the hood 12. Moreover, the air intake system 10 comprises at least one air pipe 24 having at least one air duct 26 (FIG. 5) with at least one inlet opening 28 (FIGS. 4 and 5) through which the air flowing through the frontal intake opening 14 can flow. In other words, at least the portion of the amount of air flowing through the intake opening 14 can flow through the inlet opening 28 so that the air flowing through the inlet opening 28 flows into the air duct 26 of the air pipe 24. The air flowing into the air duct 26 can flow through the air pipe 24 so that the air flowing through the air pipe 24 is guided by means of the air pipe 24. The air duct 26 is arranged upstream of the plenum 18, wherein the air duct 26 is fluidically connected with the plenum 18 so as to guide the air to and into the plenum 18. In other words, the air flowing through the air duct 26 can flow out of the air duct 26 and into the plenum 18. The air pipe 24 and the hood 12 are configured as individual components which are removably or reversibly connected with each other at least indirectly. The air pipe 24 and, thus, the air duct 26 and the inlet opening 28 are part of or arranged in the air path since the air to be guided to and into the engine is guided by means of the air pipe 24.

Figure 7:
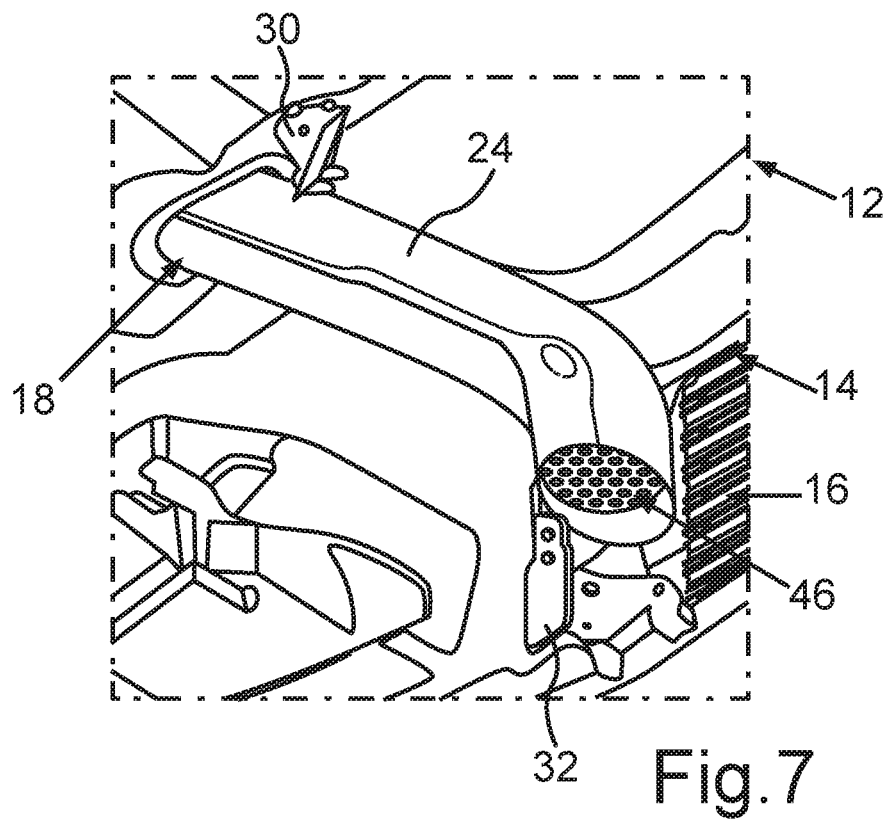
FIG. 7 is part of a further schematic perspective view of the air intake system.

For example, the air pipe 24 is configured as a subsection pipe designed for removable access to the plenum 18 of the hood 12. This means the air pipe 24 can be connected with and disconnected from the hood 12 without damaging the hood 12 or the air pipe 24. This means the air pipe 24 is configured as a removable subsection pipe which can be connected with the hood 12 by means of, for example, at least two brackets 30 and 32 shown in FIG. 7. After removal of the two brackets 30 and 32, the air pipe 24 being an inlet pipe can be removed, for example, for servicing, and for removable access to the plenum 18.

The air intake system 10 further comprises at least one air filter 34 (FIG. 2) configured to filter the air flowing through the air path. Thus, the air filter 34 which is also referred to as an air cleaner is part of or arranged in the air path. The air flowing through the air path can flow through the air filter 34 so that the air is filtered.

Figure 9:
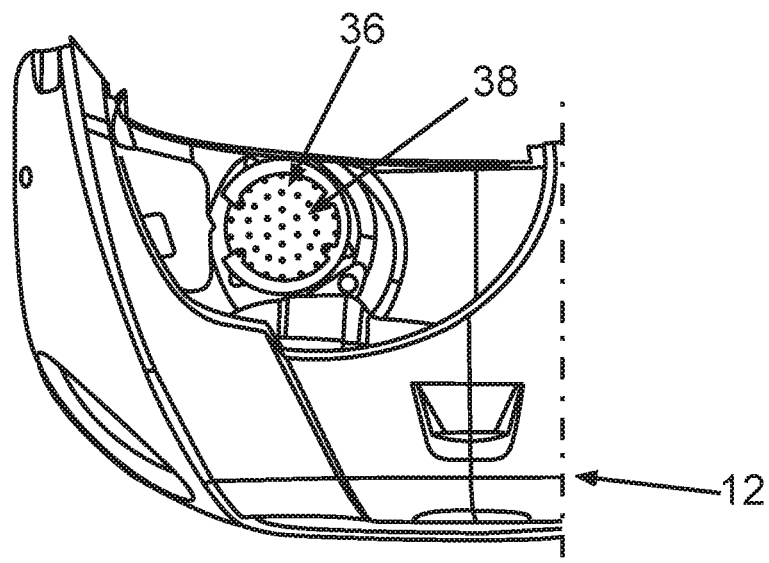
FIG. 9 is part of a schematic top view of the air intake system.
Figure 10:
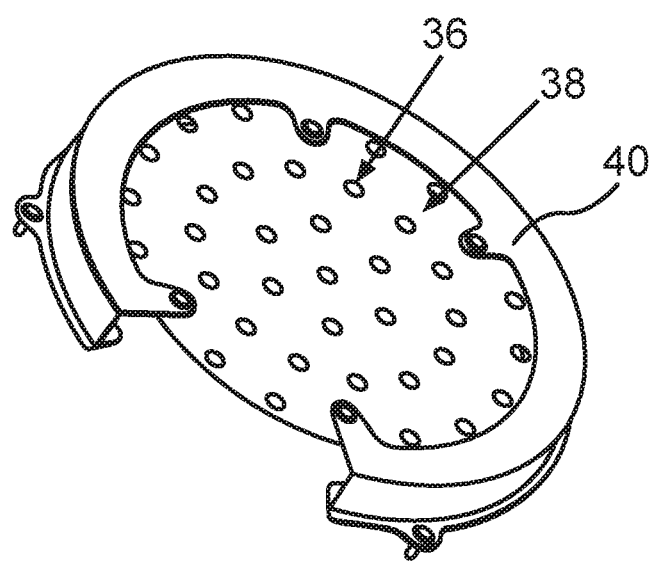
FIG. 10 is a schematic perspective view of a silencer plate of the air intake system.

Additionally, the air intake system 10 comprises at least one silencer plate 36 shown in FIGS. 9 and 10. The silencer plate 36 is rigid or inherently stable, wherein the silencer plate 36 is arranged in the air path upstream of the air filter 34. As can be seen from FIGS. 9 and 10 the silencer plate has a plurality of through openings 38 through which the air flowing through the air path can flow. For example, the silencer plate 36 is mounted on the hood 12 via a mounting ring 40. For example, the air intake system 10 can, additionally, comprise at least one further intake on the top of the hood 12 and/or behind a front bumper. Moreover, additionally, the air intake system 10 comprises an air intake pipe insulation and/or a hood plenum baffles.

The idea behind the air intake system 10 is, that, usually, in a vehicle with a naturally aspirated engine and typical air intake system, air is channeled to the engine with minimal obstruction other than the air filter element. Sound emanating from the engine follows the opposite path, exiting through at least one air inlet and contributing to the vehicle exterior noise emission. The transmission of sound through the air intake system, most likely through components such as the hood which are attached or immediately adjacent to the driver's cab which is also referred to as passenger cab, can further increase vehicle interior noise emission. Aside from federally regulated limits, cab interior noise quality can be especially relevant to customer's satisfaction.

As will be described in greater detail below, the air intake system 10 incorporates several features to block, self-cancel or otherwise modify noise emanating from the engine air inlet, with the end result of reduced overall exterior and cab interior noise. Additional features of the air intake system make the air intake more reliable in adverse operating conditions such as cold weather or improved functionality in areas such as air moisture separation. These features and their benefits are further described in the following. In other words, the air intake system 10 was developed to reduce vehicle exterior noise levels through the combination of the following component features. A first one of the component features is the frontal intake opening 14 which is also referred to as a frontal intake. The frontal intake opening 14 is lengthened and rerouted to duct air in from the front of the commercial vehicle as opposed to the left side of the vehicle as it's customary on medium and heavy duty commercial vehicles. This means the air flowing through the air path is introduced into the air path from the frontal intake opening 14 and, thus, from the front of the commercial vehicle rather than from the side. While minding total system flow restriction, additional length and turns were added to increase reflection and self-cancellation of sound waves within the intake, in particular the air path, and to increase separation of water, dirt, and other contaminants from the engine air intake flow. The improvement in overall vehicle exterior noise is shown in the diagram of FIG. 3, where decibel (dBA) is plotted versus engine speed for the key portion of a pass-by test.

Figure 3:
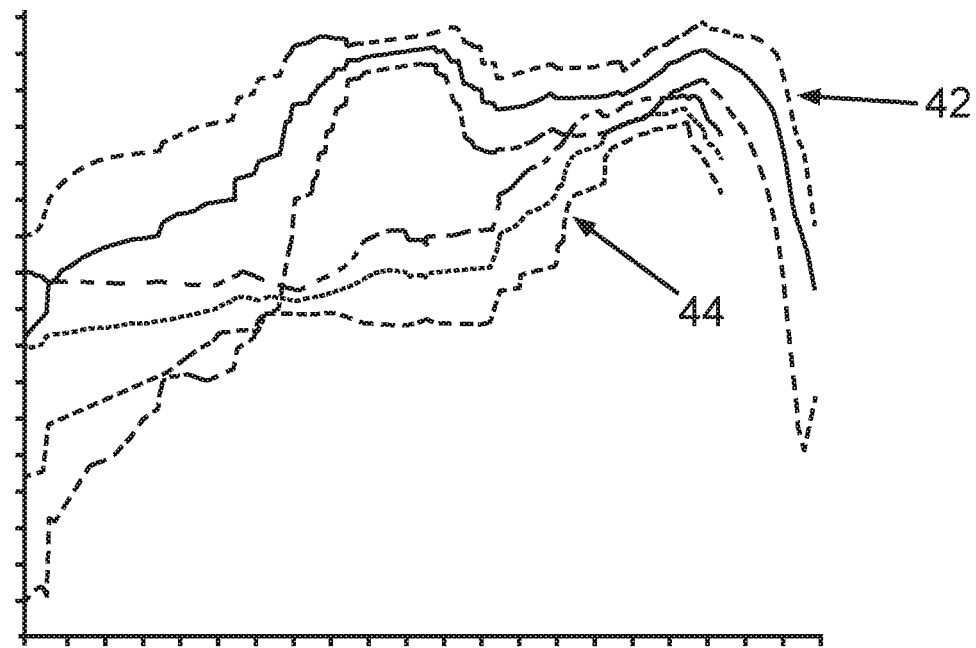
FIG. 3 is a diagram illustrating noise reduction which can be realized by means of the air intake system.

In FIG. 3, graphs 42 illustrate sound emitted by a commercial vehicle having a conventional air intake system. Moreover, in FIG. 3, graphs 44 illustrate noise emissions from the commercial vehicle having the air intake system 10. An additional benefit of the frontal intake is a balancing of left and right side vehicle noise emission. Whereas the traditional side air intake produces a stronger noise just on that side, the frontal air intake of the air intake system 10 lowers the noise power on that side in favor of a more balanced noise level.

A second one of the component features is an overall system length tuned to the vehicle and engine. This means the air path has a length which is tuned to the vehicle and engine so as to keep noise emissions particularly low. For this purpose, acoustic tuning was performed using a hood bench test with a frequency generator in the vehicle during pass-by testing at a track, in order to determine the optimal overall intake length, i.e., length of the air path. Data was first collected with a microphone placed adjacent to the original side air intake grille while the vehicle was driven through a normal pass-by test on a closed track. Results were plotted so that hotspots of noise emission could be identified, the hotspots representing the points where, for at a certain engine RPM and frequency, the loudest exterior noise is emitted through the air intake. These served as targets for the air intake tuning. Next, bench testing was performed with intakes of varying length, diameter, etc., to characterize transmission of noise. Again, results were plotted. From these plots two relevant characteristics became immediately evident. First, the final front air intake design attenuates noise propagations significantly in the regions around 220 Hz and 440 Hz, which are the first and second engine firing orders at 3300 revolutions per minute (RPM), where total vehicle exterior noise first peaks during the pass-by test. Secondly, modest attenuation is achieved between 800 and 950 Hz, most notably around 850 Hz, which is a region of acoustic hotspots.

A third one of the component features is a downward facing inlet to scatter noise in the engine compartment and on the ground, the downward facing inlet being formed by the air pipe 24. This means, the air pipe 24 is configured or formed, in particular bent, in such a way that the inlet opening 28 faces downwards in the vertical direction of the vehicle. This means the inlet opening 28 being an air intake inlet is pointed directly downwards, so that engine noise propagating forward through the air intake system 10 is partially scattered within the engine compartment and diffusely on the ground. This servers to partially attenuate the total sound pressure and reduce the directionality of a major source of the vehicle exterior noise. The air pipe 24 extending downwards in the vertical direction of the vehicle so that the inlet opening 28 faces downwards can be seen in FIG. 4 in relation to the hood 12.

A fourth one of the component features is an inlet mesh 46 through which the air can flow, the inlet mesh 46 being arranged in the air duct 26 upstream of the air filter 34 and the silencer plate 36. The inlet mesh 46 is incorporated into the air intake system 10 to guard against ingestions of large contaminant objects which additionally provides modest sound attenuation through wave reflection, refraction, and flow straightening. For example, the inlet mesh 46 is inherently stable or flexible.

Figure 5:
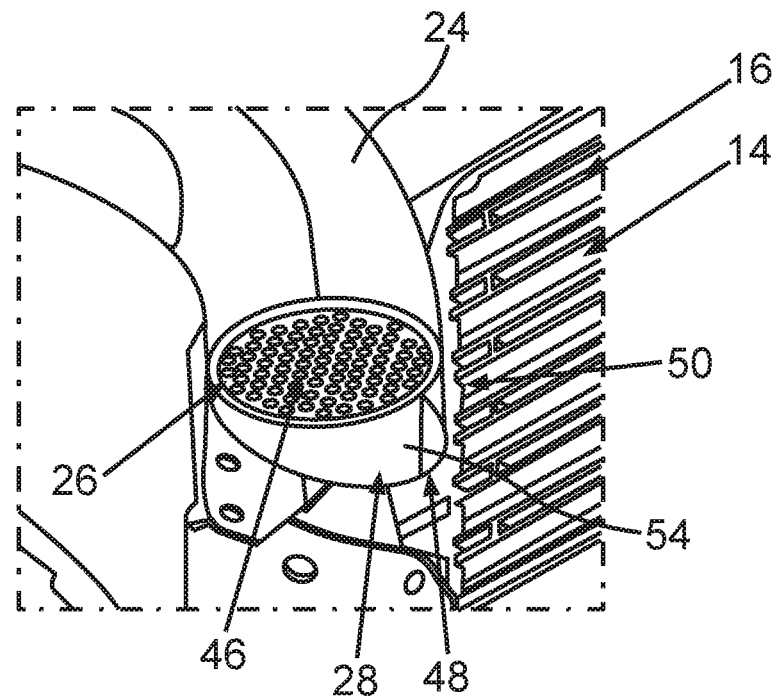
FIG. 5 is part of a further schematic perspective view of the air intake system.
Figure 6:
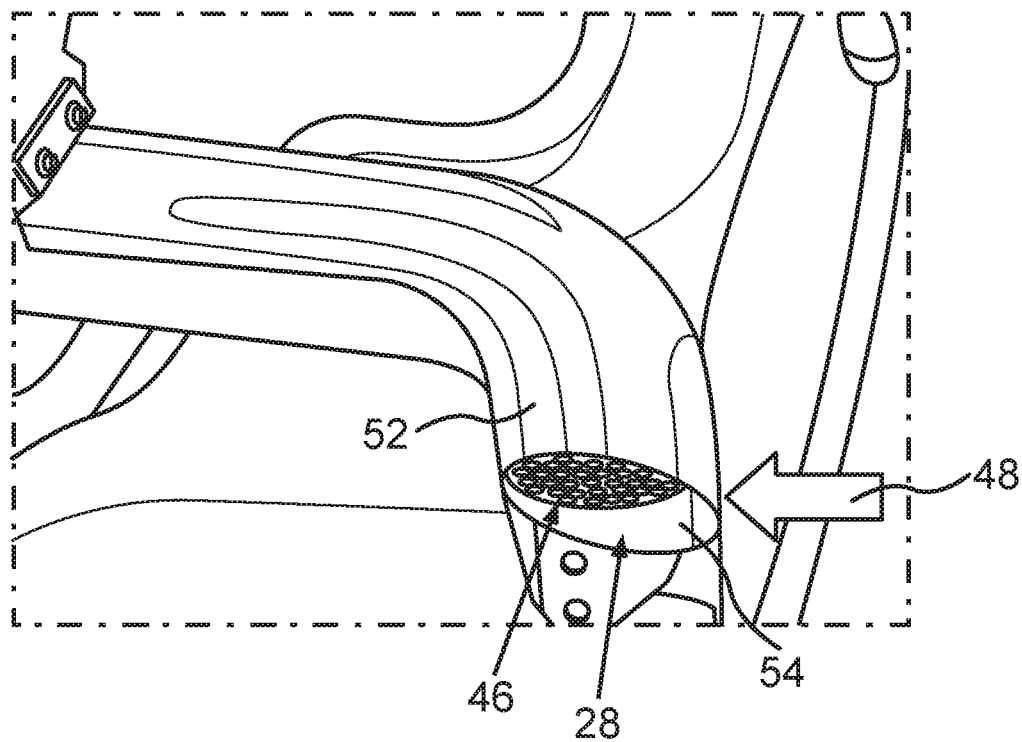
FIG. 6 is part of a further schematic perspective view of the air intake system.

A fifth one of the component features is an inlet condensation drip feature to prevent lockage caused by moisture refreeze, the inlet condensation drip feature is also referred to as a condensation drip element 48 (FIGS. 5 and 6). As can be seen from FIGS. 5 and 6, the air pipe 24 has an end portion 50 comprising the inlet opening 28 and the compensation drip element 48 configured to make condensate from the air drip off the air pipe 24. As can be seen from FIG. 6, the air pipe 24 has at least two opposing wall portions 52 and 54 bounding the air duct 26, in particular, the inlet opening 28, partially respectively. The wall portion 54 towers above the wall portion 52 thereby forming the condensation drip element 48. Since the condensation drip element 48 is arranged in the end portion 50 in which the inlet opening 28 is arranged, the condensation drip element 48 is configured as an inlet condensation drip feature which is incorporated into the air intake system 10 to prevent blockage caused by moisture refreeze. As humidity from air ingested into the forward part of the air intake system 10 precipitates out of the air, it can collect on inner walls of the air pipe 24 and drip back down through the inlet face. In cold weather, this dripping compensation can freeze, so the feature concentrates drippage on the forward lip formed by the wall portion 54 to reduce the likelihood of inlet blockage. Thus, the condensation drip features configured as a moisture drip feature.

Figure 8:
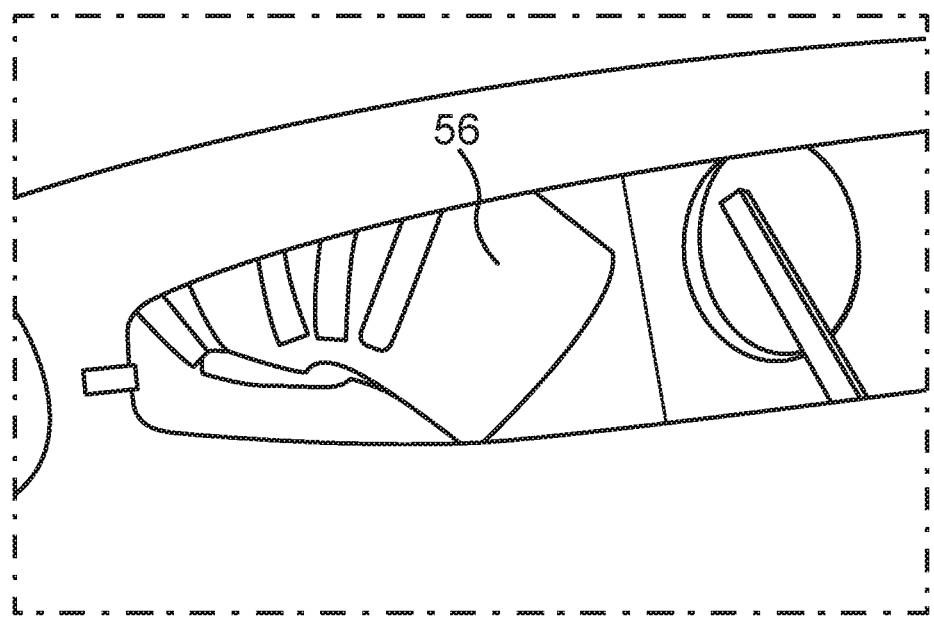
FIG. 8 is part of a further schematic perspective view of the air intake system.

A sixth one of the component features is the subsection pipe formed by the air pipe 24. A seventh one of the component features is a downturned pipe integrated into the hood plenum 18 for acoustic scattering and increased water separation, the downturned pipe being shown in FIG. 8 and indicated by 56. The downturned pipe 56 is arranged in the air path, wherein the downturned pipe 56 forms a portion of the air path, the portion being configured to force the air to flow downwards in the vertical direction of the vehicle before flowing back upwards through the plenum 18. In other words, the design of the air intake system 10 was further refined to duct air flow within the hood plenum 18 for improved water separation, and scatter noise transmitted and reflected through the air intake system 10. Whereas a typical air intake system includes a simple widened cross section, the design of the air intake system also incorporates a partial curve length of the forward intake tubing inside the hood plenum cavity.

Improved water separation is accomplished by forcing incoming air downwards before it travels back upwards through the hood plenum 18, causing gravity to pull moisture out of the rising air. In the air intake system 10, the air is forced to flow downwards by means of the downturned pipe 56. Sound waves are similarly forced to take an indirect path back from the engine to the vehicle exterior, with each turn in the ducting system providing more opportunity for acoustic reflection, refraction, and self-cancellation.

In the following, the silencer plate 36 is described in greater detail, the silencer plate 36 being an eighth one of the component features. Contributions of the air intake system 10 to exterior vehicle noise are further reduced with the silencer plate 36. In the embodiment shown in the figures, the silencer plate 36 has a two-piece design, since the silencer plate 36 is mounted on the hood 12 by means of the mounting ring 40. In the embodiment shown in the figures, the silencer plate 36 comprises 33 through opening 38 which are also referred to as holes. Thus, the two-piece design includes a 33-hole perforated flat plate being the silencer plate 36 and a mounting bracket in form of the mounting ring 40 to allow serviceability of the hood plenum 18 which is also referred to as a hood plenum cavity. Numerous designs with varying hole quantity, size, and orientation were tested on the metrics of sound attenuation in air flow restriction. Increased flow area, with more and/or larger holes, decreased restriction but also increased sound propagation, while increased silencer plate area had the inverse effect.

The final design achieved the air flow properties that kept intake restriction within acceptable limits while maximizing sound attenuation, through a combination of calculated total flow area and hole size, quantity, and radial pattern. Engine noise travelling through the air intake ducting is reflected and refracted by the silencer plate 36.

Figure 11:
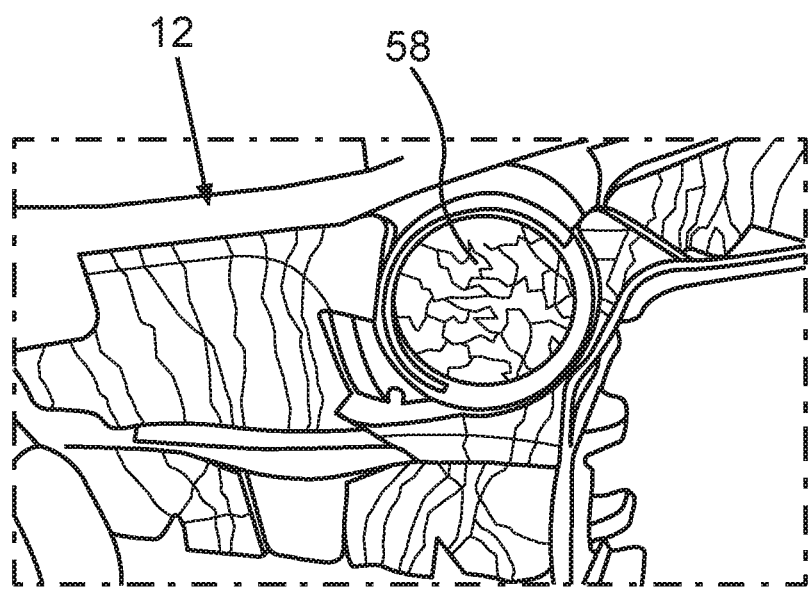
FIG. 11 is part of a schematic bottom view of the air intake system.

A ninth one of the component features is an acoustic absorption disc 58 shown in FIG. 11. For example, the acoustic absorption disc 58 is made of an insulation material, in particular foam, so that the acoustic absorption disc 58 is also referred to as a foam disc. Preferably, the foam disc is arranged parallel to and directly above the silencer plate 36 to capture noise impingent upon the inner hood surface. For example, the acoustic absorption disc 58 being a disc of insulation is positioned in the plenum 18. With the hood 12 closed, the acoustic absorption disc 58 being, for example, a flat surface, is directly above the air cleaner. The acoustic absorption disc 58 is an insulating piece which is able to directly absorb sound waves impingent upon it as they travel upstream from the engine, unobstructed by a turbocharger—an acoustic scenario unique to naturally aspirated spark ignition engines.

LIST OF REFERENCE SIGNS 10 air intake system
12 hood
14 frontal intake opening
16 grille
18 plenum
20 arrow
22 arrow
24 air pipe
26 air duct
28 inlet opening
30 bracket
32 bracket
34 air filter
36 silencer plate
38 through opening
40 mounting ring
42 graphs
44 graphs
46 mesh
48 condensation drip element
50 end portion
52 wall portion
54 wall portion
56 downturned pipe
58 acoustic absorption disc The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air intake system for a commercial vehicle, comprising:
    a hood, wherein the hood at least partially covers an engine compartment of the commercial vehicle and wherein the hood includes:
        a frontal intake opening through which air to be guided to an engine of the commercial vehicle is flowable; and
        a hood plenum cavity configured to receive air flowing through the frontal intake opening;
    an air pipe having an air duct with an inlet opening through which air flowing through the frontal intake opening is flowable, wherein the air duct is disposed upstream of, and is fluidically connected with, the hood plenum cavity so as to guide air to and into the hood plenum cavity, wherein the air pipe and the hood are configured as individual components, and wherein the air pipe is removably connected to the hood;
    an air filter; and
    a silencer plate disposed upstream of the air filter, wherein the silencer plate has a plurality of through openings through which air is flowable and wherein the silencer plate has a mounting ring that is mounted on the hood.

2. The air intake system according to claim 1, wherein the inlet opening faces downwards in a vertical direction of the commercial vehicle.

3. The air intake system according to claim 1, further comprising an inlet mesh through which air is flowable, wherein the inlet mesh is disposed in the air duct upstream of the air filter and the silencer plate.

4. The air intake system according to claim 1, wherein the air pipe has an end portion comprising the inlet opening and has a condensation drip element, wherein the condensation drip element makes condensate from air drip off the air pipe.

5. The air intake system according to claim 1, further comprising an air path through which air is flowable, wherein the air path comprises the hood plenum cavity, the air duct, and a portion configured to force air to flow downwards in a vertical direction of the commercial vehicle before flowing back upwards through the hood plenum cavity.

6. The air intake system according to claim 1, further comprising an acoustic absorption disc disposed directly above the air filter and wherein the acoustic absorption disc is made of insulation material.

7. The air intake system according to claim 6, wherein the acoustic absorption disc is disposed above and parallel to the silencer plate.

* * * * *